April 12, 1927.
J. G. BOWMAN
1,624,035
LINING FOR BRAKE BANDS AND SHOES
Filed July 3, 1925
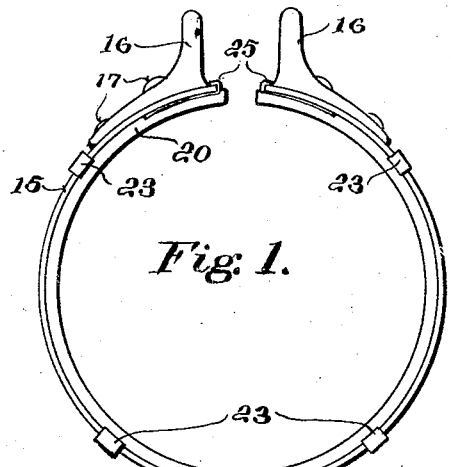
Fig. 1.
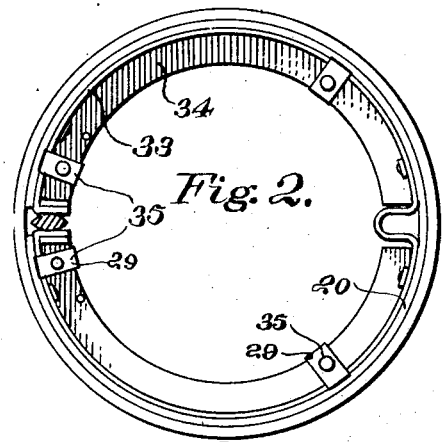
Fig. 2.
Fig. 3.
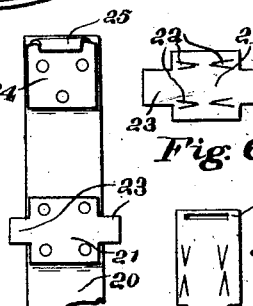
Fig. 4.
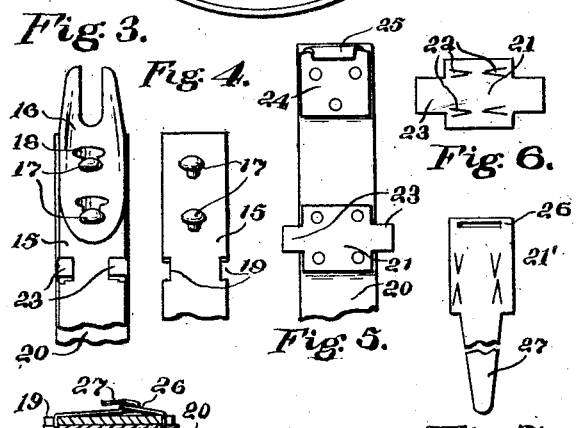
Fig. 5.
Fig. 6.
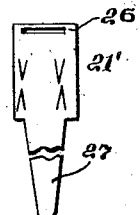
Fig. 7.
Fig. 8.
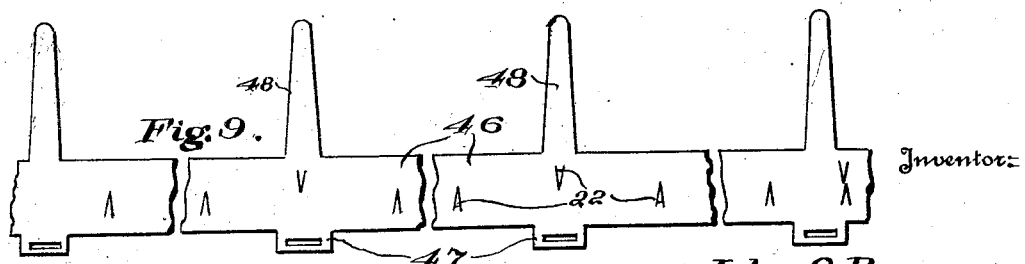
Fig. 9.
Inventor
John G. Bowman,
By H. L. Woodward
Attorney Patented Apr. 12, 1927.

1,624,035

UNITED STATES PATENT OFFICE.

JOHN G. BOWMAN, OF KANSAS CITY, MISSOURI, ASSIGNOR OF ONE-HALF TO WILLIAM C. HASELTINE, OF KANSAS CITY, MISSOURI.

LINING FOR BRAKE BANDS AND SHOES.

Application filed July 3, 1925. Serial No. 41,430.

The invention has for an object to provide a quickly renewable lining means for brake bands and shoes, which may be produced at a low cost, and which may be substituted for a worn-out lining without requiring mechanical dexterity or expertness in the use of riveting devices and the like, requiring only the use of the hand. This device is distinct from the class of quickly replaceable bands, and my relining device may be used both on the ordinary form of transmission and brake-bands as now employed in various motor vehicles, as well as on the quickly replaceable bands designed especially to enable ready removal of the brake band from its mounting around the drum.

It is an aim of the invention to provide a novel construction especially adapted to retain a lining securely against relative movement with respect to the band upon which it is secured, notwithstanding that means are employed for attachment of the lining which are not necessarily as rigid as rivets, such as heretofore employed for securing linings upon brake-bands and the like.

Additional objects, advantages and features of invention reside in the construction, arrangement and combination of elements as will be more readily understood from the following description and accompanying drawings, wherein, Figure 1 is an elevational view of a familiar type of transmission clutch band and brake band, as used in a well known type of motor vehicle, now most largely used in this country.

Figure 2 is a similar view of an internal expanding emergency brake, as used on the same make of motor vehicle.

Figure 3 is a detail of one end of the transmission band assembled with lining.

Figure 4 is a similar view of the metal band end alone, with the end fitting removed.

Figure 5 is a similar view of one end of the lining element.

Figure 6 is a detail of an attaching means.

Figure 7 is a similar view of a modification of the attaching means.

Figure 8 is a cross section of a band brake showing the use of the attaching means of Figure 7, and Figure 9 is a similar view of a lining employing the features of Figures 7 and 8 before mentioned.

There is illustrated in Figure 1 a brake and transmission band comprising a resilient, flexible metal band 15, such as is familiar in appliances of this character, having two terminal fittings 16 by which the band is secured in place and operated, the details of which are familiar in the art. The fitting 16 may be permanently attached or removably attached, as shown in Figures 3 and 4, where headed studs 17 are shown mounted upon the band 15, and the fitting 16 is provided with slots 18 enlarged in one direction receiving the heads of the studs therethrough, the reduced portion of the slots being adapted to engage snugly around this stud under the head. The band 15 projects slightly at the ends beyond the fittings 16, as shown at the upper part of Figure 1, and in the edges of the band 15 there are formed a series of notches 19 in alined pairs. A facing or lining 20 is shown, which may be of any ordinary material employed for this purpose, such as woven fabric, a combination of woven fabric and cork, or other material as may be found expedient. Secured to the lining 20 on the face thereof adjacent the band 15, there is a series of very thin, malleable metal attaching plates 21, which may be riveted to the lining 20, as shown in Figure 5, or may be secured thereto by integral spurs 22 struck from the plate 21, as indicated in Figure 6. The plates 21 have at opposite sides integral ears 23 extended therefrom comprising continuations of the plates, and the plates are so spaced upon the lining that the ears will aline with respective pairs of notches 19 in the band 15. At the ends of the lining there are provided plates 24, which may be similarly secured, these having hook-like end portions 25 disposed adjacent the end of the lining and adapted to engage around the end edges of the band 15 as shown in Figure 1. If preferred, the plates 21 and 24 may be made as a continuous facing attached to the lining, extending from end to end of the lining, as will be understood, one form of continuous attaching plate being shown in Figure 9.

The material of the plate 21 is extremely thin, malleable metal, or metal manually bendable, that will retain deformed shape, so that the ears 23 may be easily bent manually into the notches 19 when the lining is put in place, and pressed inwardly over the band 15, as shown in Figures 1 and 3.

In another form, which may be found preferable, the plate 21' as shown in Figures 7 and 8, corresponding to the plate 21 before described, may be formed of a size to project slightly beyond the band 15 to be bent upwardly and inwardly therebeside, and having a transverse slot 26 therein, while at the opposite side of the plate a tongue 27 is provided adapted to be bent inwardly around the band and inserted through the slot 26 of the opposite end of the plate. The two are bent down snugly over the band, the tongue inserted in the slot and bent back on itself sharply, so as to secure the slotted portion and the tongue against separation, as shown in Figure 8.

In Figure 9 a continuous band is shown wherein slotted ears 47 are provided at one side and tongues 48 at the other, both adapted to be bent inwardly over a band or shoe and the ends of the tongue inserted through the slots of the ears 47 and secured, as shown in Figure 8. The relative lengths of the tongues and ears may be varied, as found desirable. The manipulation of the tongues 27 and 48 may be accomplished manually and very secure adjustment thereof effected with expedition.

The device may be used in connection with ordinary brake-bands without having the band proper slotted, as at 19, if desired, and the plate 24 depended on to prevent slipping of the lining on the band or shoe.

The invention may thus be sold either as a lining with bands slotted to receive the ears and tongues before described, or the lining may be offered alone with the fastening devices attached, so as to be applied to ordinary bands. Renewal for the special bands may be sold separately, as required. Also, it is possible to sell the fastening devices in sets to be attached by the buyer to any desired lining material. Thus, for instance, the fastening element 46 of Figure 9 may be attached to the usual woven fabric lining by cutting the fabric to the proper length, laying the fastening elements with the points 22 presented upwardly on a suitable surface, laying the fabric upon the fastening, and hammering the fabric down upon the points so as to embed the points and turn the points in the fabric, as will be readily understood.

It is evident that the invention may be produced commercially by familiar shop operations and at a low cost.

I claim:

1. A replacement lining for brake bands and shoes comprising a friction facing material, and exceedingly thin metal securing elements extended laterally therefrom adapted to be bent backwardly upon a band or shoe by the use of the hands alone, whereby a lining may be secured in place without the use of an implement.

2. The article of claim 1 in which said metal elements are formed at one side with slots and at the other with narrowed portions adapted to be inserted through the slots.

In testimony whereof I affix my signature.

JOHN G. BOWMAN.